(12) United States Patent
Suzuki (10) Patent No.: US 11,387,691 B2
(45) Date of Patent: Jul. 12, 2022

(54) ARMATURE

(71) Applicant: DENSO CORPORATION, Kariya (JP)

(72) Inventor: Takumi Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 312 days.

(21) Appl. No.: 16/811,482

(22) Filed: Mar. 6, 2020

(65) Prior Publication Data

US 2020/0295608 A1 Sep. 17, 2020

(30) Foreign Application Priority Data

Mar. 14, 2019 (JP) .............................. JP2019-047147

(51) Int. Cl.
| | |
|---|---|
| H02K 1/14 | (2006.01) |
| H02K 3/28 | (2006.01) |
| H02K 15/095 | (2006.01) |
| H02K 15/02 | (2006.01) |
| H02K 3/18 | (2006.01) |
| H02K 3/34 | (2006.01) |
| H02K 3/52 | (2006.01) |

(52) U.S. Cl.
CPC .............. *H02K 1/148* (2013.01); *H02K 3/18* (2013.01); *H02K 3/28* (2013.01); *H02K 3/345* (2013.01); *H02K 3/522* (2013.01); *H02K 15/02* (2013.01); *H02K 15/095* (2013.01); *H02K 2203/06* (2013.01)

(58) Field of Classification Search
CPC ........... H02K 1/148; H02K 3/18; H02K 15/02
USPC .......................................................... 310/71
See application file for complete search history.

(56) References Cited

U.S. PATENT DOCUMENTS

| | | | |
|---|---|---|---|
| 2012/0098381 A1 | 4/2012 | Seki et al. | |
| 2013/0200742 A1 | 8/2013 | Seki et al. | |
| 2015/0091409 A1* | 4/2015 | Yoshikawa | ............ H02K 3/522 |
| | | | 310/215 |
| 2017/0141627 A1 | 5/2017 | Seki et al. | |

FOREIGN PATENT DOCUMENTS

| | | | | |
|---|---|---|---|---|
| EP | 1499000 A1 * | 1/2005 | ............ | H02K 1/148 |
| JP | 2012-110212 A | 6/2012 | | |
| JP | 5502115 B2 | 5/2014 | | |
| JP | 5536123 B2 | 7/2014 | | |
| JP | 6247595 B2 | 12/2017 | | |
| WO | WO-2013157101 A1 * | 10/2013 | ............ | H02K 1/148 |

* cited by examiner

*Primary Examiner* — Jose A Gonzalez Quinones
(74) *Attorney, Agent, or Firm* — Maschoff Brennan (57) ABSTRACT

A stator includes a connecting insulator member having a guide portion that connects two insulators, and jumper wires that are guided by the guide portion and connect two coils. The connection insulator member includes a lower layer insulator member, an intermediate layer insulator member, and an upper layer insulator member. The guide portion of the lower layer insulator member has a lower layer arc connecting part, the guide portion of the intermediate layer insulator member has an intermediate layer arc connecting part, and the guide portion of the upper layer insulator member has an upper layer arc connecting part. The intermediate layer arc connecting part is arranged above in the axial direction with respect to the lower layer arc connecting part in the axial direction, and the upper layer arc connecting part is arranged outside in the radial direction with respect to the intermediate layer arc connecting part.

7 Claims, 8 Drawing Sheets

ARMATURE

CROSS REFERENCE TO RELATED APPLICATION

The present application is based on Japanese Patent Application No. 2019-47147 filed on Mar. 14, 2019, the disclosure of which is incorporated herein by reference.

TECHNICAL FIELD

The present disclosure relates to an armature.

BACKGROUND

Conventionally, in a stator that is an armature of a motor, a plurality of core constituent members having teeth extending inward in a radial direction are arranged in a circumferential direction, and coils are wound around the teeth via an insulator.

SUMMARY

An object of the present disclosure is to provide an armature that can easily realize the guide portion in which guide portions do not interfere with each other.

The armature includes a plurality of core constituent members that have teeth extending in a radial direction and are arranged side by side in a circumferential direction, a connecting insulator member having an insulator covering the teeth and a guide portion configured to connect two insulators spaced apart in the circumferential direction, coils that is wound around the teeth via the insulator, and a jumper wire that is guided by the guide portion so as to connect two coils. The connecting insulator member includes a lower layer insulator member, an intermediate layer insulator member, and an upper layer insulator member that are assembled in the axial direction. The guide portion of the lower layer insulator member includes a lower layer arc connecting part having an arc shape when viewed from the axial direction, the guide portion of the intermediate layer insulator member includes an intermediate layer arc connecting part having an arc shape when viewed from the axial direction, and the guide portion of the upper layer insulator member includes an upper layer arc connecting part having an arc shape when viewed from the axial direction. The intermediate layer arc connecting part is arranged above in the axial direction with respect to the lower layer arc connecting part, and the upper layer arc connecting part is arranged outside in the radial direction with respect to the intermediate layer arc connecting part.

DETAILED DESCRIPTION

Hereinafter, an embodiment of a motor including a stator as an armature will be described with reference to the drawings. In the drawings, for convenience of explanation, part of the configuration may be shown exaggerated or simplified. Also, the dimensional ratio of each part may be different from the actual one.

Figure 1:
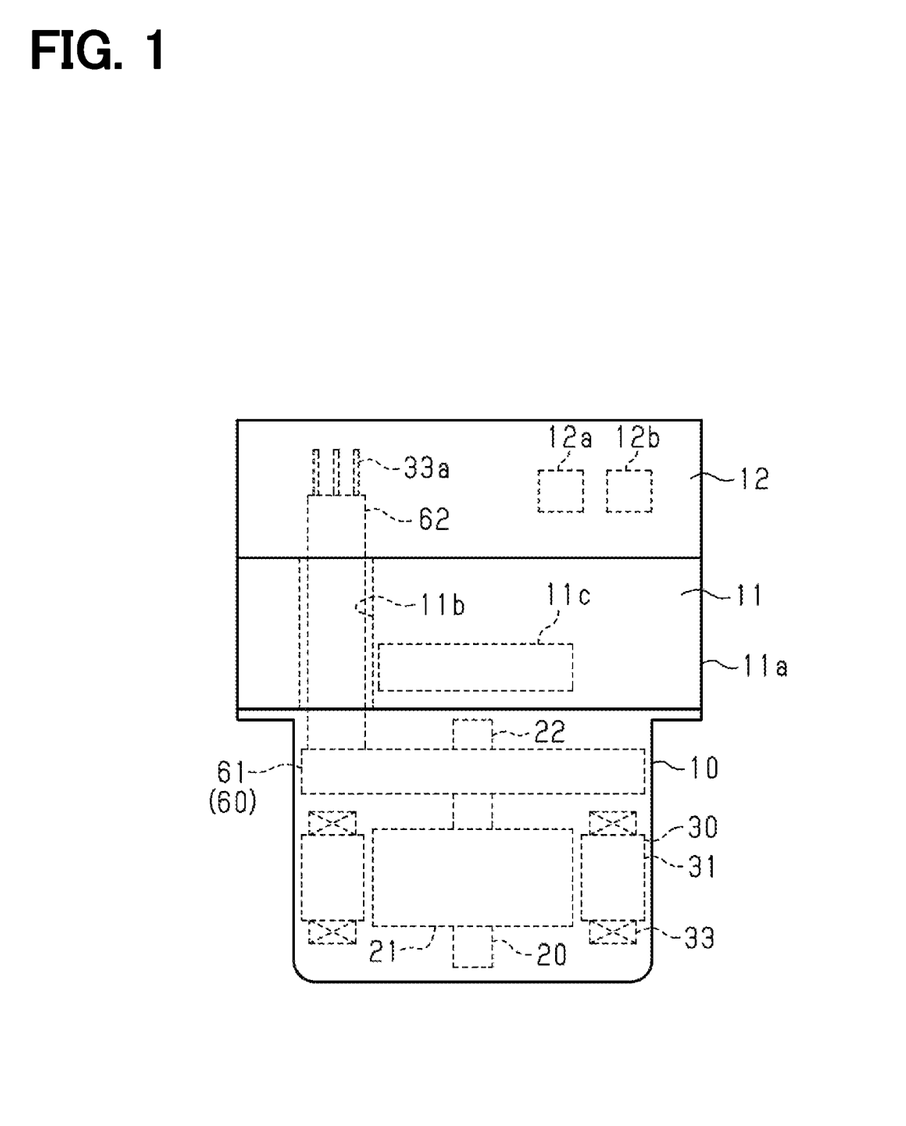
FIG. 1 is a schematic configuration diagram of an electric brake system including a motor according to an embodiment.

As shown in FIG. 1, a motor 10 is used for an electric brake system. The electric brake system includes a hydro unit 11 that adjusts a hydraulic pressure of a brake fluid, the motor 10 that is connected to the hydro unit 11 and drives the hydro unit 11, and an EDU (ELECTRIC DRIVER UNIT) 12 that controls a drive of the motor 10. In the brake system of the present embodiment, the hydro unit 11 is interposed between the EDU 12 and the motor 10. The motor 10 and the EDU 12 are electrically connected through a through hole 11b provided in a housing 11a of the hydro unit 11.

The motor 10 of the present embodiment includes a rotor 20 and a stator 30. As shown in FIG. 1, the rotor 20 is provided on an inner side in a radial direction of the stator 30, and has a rotor core 21, magnets (not shown) provided on the rotor core 21, and a rotation shaft 22 provided at the radial center of the rotor core 21. One end in the axial direction of the rotation shaft 22 is directly or indirectly connected to a gear 11c in the hydro unit 11. As a result, when the rotation shaft 22 is rotationally driven, the gear 11c in the hydro unit 11 is driven to adjust the hydraulic pressure of the brake fluid.

Figure 2:
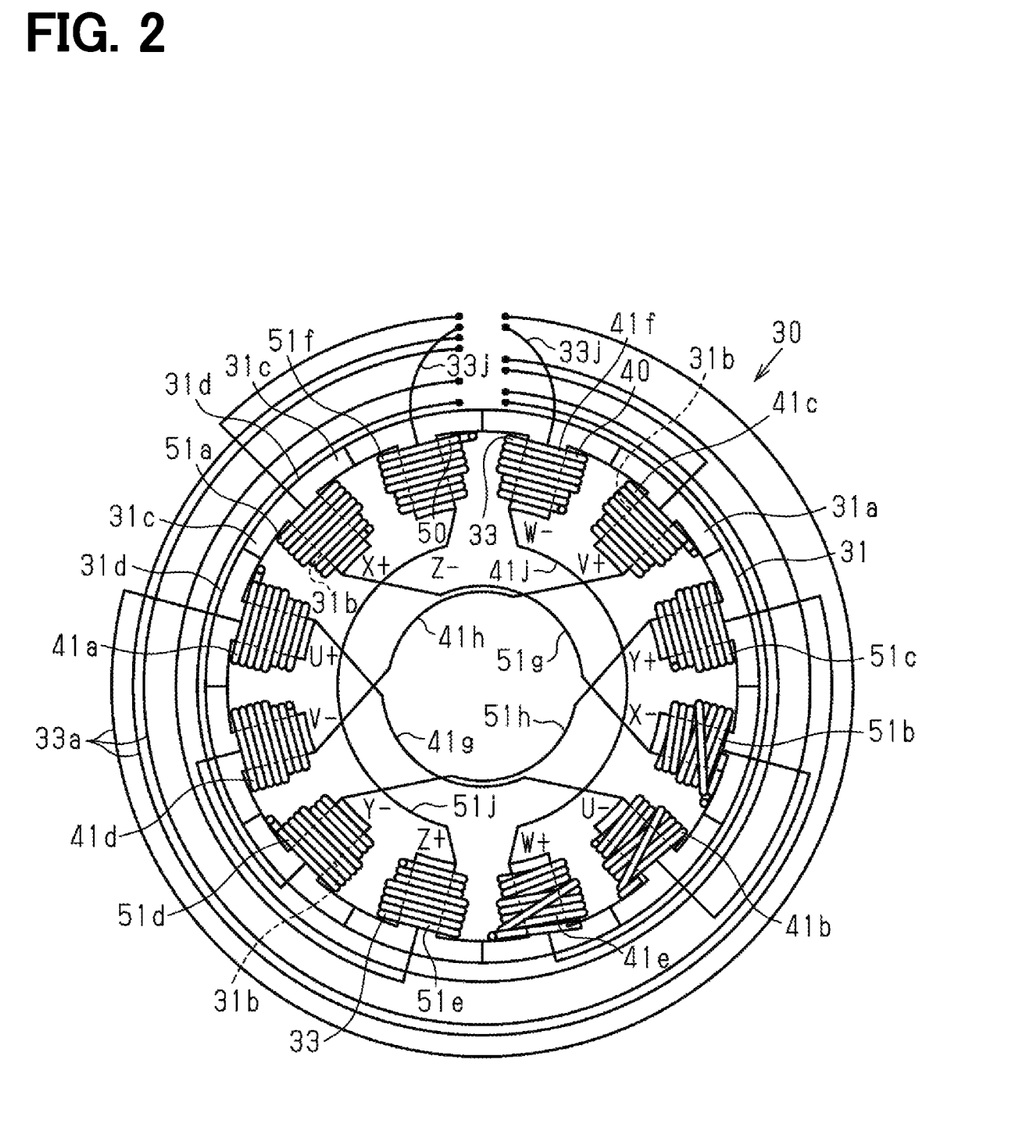
FIG. 2 is a schematic plan view of a stator in the same embodiment.
Figure 3:
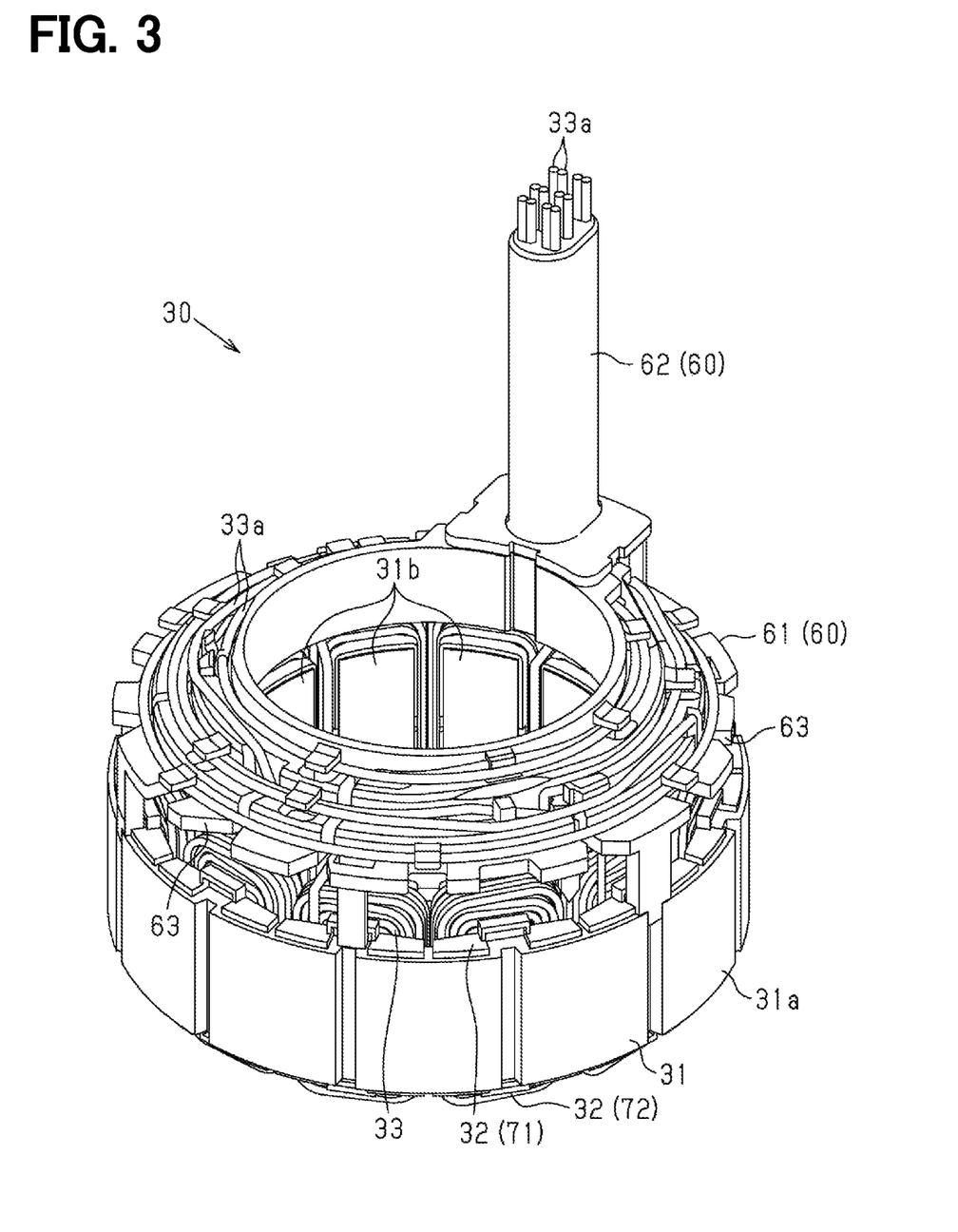
FIG. 3 is a perspective view of the stator in the embodiment.

As shown in FIGS. 2 and 3, the stator 30 includes a stator core 31, an insulator 32 (not shown in FIG. 2) of the stator core 31, and coils 33.

The stator core 31 has a substantially annular portion 31a and a plurality of teeth 31b extending radially inward from the annular portion 31a. In the present embodiment, for example, twelve teeth 31b are provided. The coils 33 are wound around each of teeth 31b with the insulator 32 which covers the teeth 31b and is located in therebetween. The coils 33 are wound in, for example, a concentrated manner.

The coils 33 include a first three-phase winding 40 which is electrically connected to a first inverter circuit 12a provided in the EDU 12, and a second three-phase winding 50 which is electrically connected to a second inverter circuit 12b provided in the EDU 12. That is, in the present embodiment, first and second inverter circuits 12a and 12b constituting two systems (plurality of systems) in EDU 12 are provided, and the first and second inverter circuits 12a and 12b are supplied current to each of the three-phase windings 40 and 50.

As shown in FIG. 2, the first three-phase winding 40 has a plurality of three-phase windings 41a to 41f to which a three-phase alternating current having a phase difference of 120 degrees is supplied from the first inverter circuit 12a. The plurality of three-phase windings 41a to 41f includes U+phase winding 41a, U−phase winding 41b, V+phase winding 41c, V−phase winding 41d, W+phase winding 41e, and W−phase winding 41f.

As shown in FIG. 2, the second three-phase winding 50 has a plurality of three-phase windings 51a to 51f to which a three-phase alternating current having a phase difference of 120 degrees is supplied from the second inverter circuit 12b. The plurality of three-phase windings 51a to 51f include X+phase winding 51a, X−phase winding 51b, Y+phase winding 51c, Y−phase winding 51d, Z+phase winding 51e, and Z−phase winding 51f.

The coil 33 of the present embodiment is wound, for example, in the order of W−phase winding 41f, V+phase winding 41c, Y+phase winding 51c, X−phase winding 51b, U−phase winding 41b, W+phase winding 41e, Z+phase winding 51e, Y−phase winding 51d, V−phase winding 41d, U+phase winding 41a, X+phase winding 51a, Z−phase winding 51f, for each tooth 31b. Thus, all the coils 33 of the present embodiment have different phases from the coils 33 adjacent in the circumferential direction.

The U+phase winding 41a and the U−phase winding 41b are wound around teeth 31b provided at positions different by 150 degrees in the circumferential direction. The V+phase winding 41c and the V−phase winding 41d are wound around teeth 31b provided at positions different by 150 degrees in the circumferential direction. The teeth 31b around the W+phase winding 41e is wound and the teeth 31b around the W−phase winding 41f is wound are provided at positions different by 150 degrees in the circumferential direction.

The teeth 31b around the X+phase winding 51a is wound and the teeth 31b around the X−phase winding 51b is wound are provided at positions different by 150 degrees in the circumferential direction. The teeth 31b around which the Y+phase winding 51c is wound and the teeth 31b around which the Y−phase winding 51d is wound are provided at positions different by 150 degrees in the circumferential direction. The teeth 31b around the Z+phase winding 51e is wound and the teeth 31b around the Z−phase winding 51f is wound are provided at positions different by 150 degrees in the circumferential direction.

The U+phase winding 41a and the U−phase winding 41b are connected by a jumper wire 41g. The V+phase winding 41c and the V−phase winding 41d are connected by a jumper wire 41h. The W+phase winding 41e and the W−phase winding 41f are connected by a jumper wire 41j. The X+phase winding 51a and the X−phase winding 51b are connected by a jumper wire 51g. The Y+phase winding 51c and the Y−phase winding 51d are connected by a jumper wire 51h. The Z+phase winding 51e and the Z−phase winding 51f are connected by a jumper wire 51j. The jumper wires 41g, 41h, 41j, 51g, 51h, 51j are provided on the other end side in the axial direction of the stator core 31 and on the side not facing the hydro unit 11 (lower side in FIG. 1). As shown schematically in FIG. 2, those jumper wires are provided by being guided by a guide portion 32a (see FIG. 4) to be described later connecting the insulators 32. The jumper wire 41j connecting the W+phase winding 41e and the W−phase winding 41f and the jumper wire 51j connecting the Z+phase winding 51e and the Z−phase winding 51f are routed outward in the radial direction with respect to the other jumper wires 41g, 41h, 51g, 51h, and thus are longer than the other jumper wires 41g, 41h, 51g, 51h.

The first three-phase winding 40 of the present embodiment is connected to the first inverter circuit 12a by a delta connection. The second three-phase winding 50 is connected to the second inverter circuit 12b by a delta connection.

More specifically, a terminal line 33a of the U+phase winding 41a is connected to an U terminal of the first inverter circuit 12a together with a terminal line 33a of the W−phase winding 41f. A terminal line 33a of the U−phase winding 41b is connected to a V terminal of the first inverter circuit 12a together with a terminal line 33a of the V+phase winding 41c. A terminal line 33a of the W+phase winding 41e is connected to a W terminal of the first inverter circuit 12a together with a terminal line 33a of the V−phase winding 41d.

A terminal line 33a of the X+phase winding 51a is connected to a X terminal of the second inverter circuit 12b together with a terminal line 33a of the Z−phase winding 51f. A terminal line 33a of the X−phase winding 51b is connected to a Y terminal of the second inverter circuit 12b together with a terminal line 33a of the Y+phase winding 51c. A terminal line 33a of the Z+phase winding 51e is connected to a Z terminal of the second inverter circuit 12b together with a terminal line 33a of the Y−phase winding 51d. In addition, the jumper wires 41g, 41h, 41j, 51g, 51h, 51j connect the ends of the coil 33 on the opposite side to the above terminal line 33a for each phase.

As shown in FIG. 1, in the stator 30, a guide member 60 is provided on the side of the hydro unit 11, which is one side in the axial direction of the stator core 31.

The guide member 60 guides the terminal lines 33a of the coils 33 which is drawn from the coil 33 to one side in the axial direction, and further guides them to the EDU 12. The guide member 60 includes a guide body 61 and a pullout guide 62 for pulling out.

As shown in FIG. 3, the guide body 61 is formed in a substantially disk shape having a plurality of steps in the axial direction, and includes a plurality of notches 63 extending from the radially outer side to the radially inner side and penetrating in the axial direction. The terminal line 33a of the coil 33 passes through the notch 63 in the axial direction, is led out to one side in the axial direction of the guide body 61, is bent in the circumferential direction, and extends along the step of the guide body 61. The terminal line 33a is guided in the circumferential direction up to a part of the guide body 61 in the circumferential direction.

A pullout guide 62 is configured to have a long column shape in the axial direction, and is fixed to a part in the circumferential direction of the guide body 61. Then, the terminal lines 33a guided to a part in the circumferential direction of the guide body 61 passes through an inside of the pullout guide 62 and is led out to one side in the axial direction. As described above, the terminal lines 33a are connected to the first and second inverter circuits 12a, 12b.

Here, the stator core 31 of the present embodiment has a configuration in which the annular portion 31a is divided for each tooth 31b. The core constituent member 31d includes a tooth 31b extending radially inward and a pair of core extension portions 31c extending circumferentially from radially outer ends on both sides of the tooth 31b. A plurality of the core constituent members 31d are arranged side by side in the circumferential direction. Specifically, in the present embodiment, the core extension portions 31c of the twelve core constituent members 31d are arranged in the circumferential direction so as to form an annular shape, and the core extension portions 31c adjacent to each other in the circumferential direction are welded to form the stator core 31. The coils 33 are wound around the teeth 31b via the insulator 32 in a state before the core constituent members 31d are arranged side by side in the circumferential direction.

Figure 4:
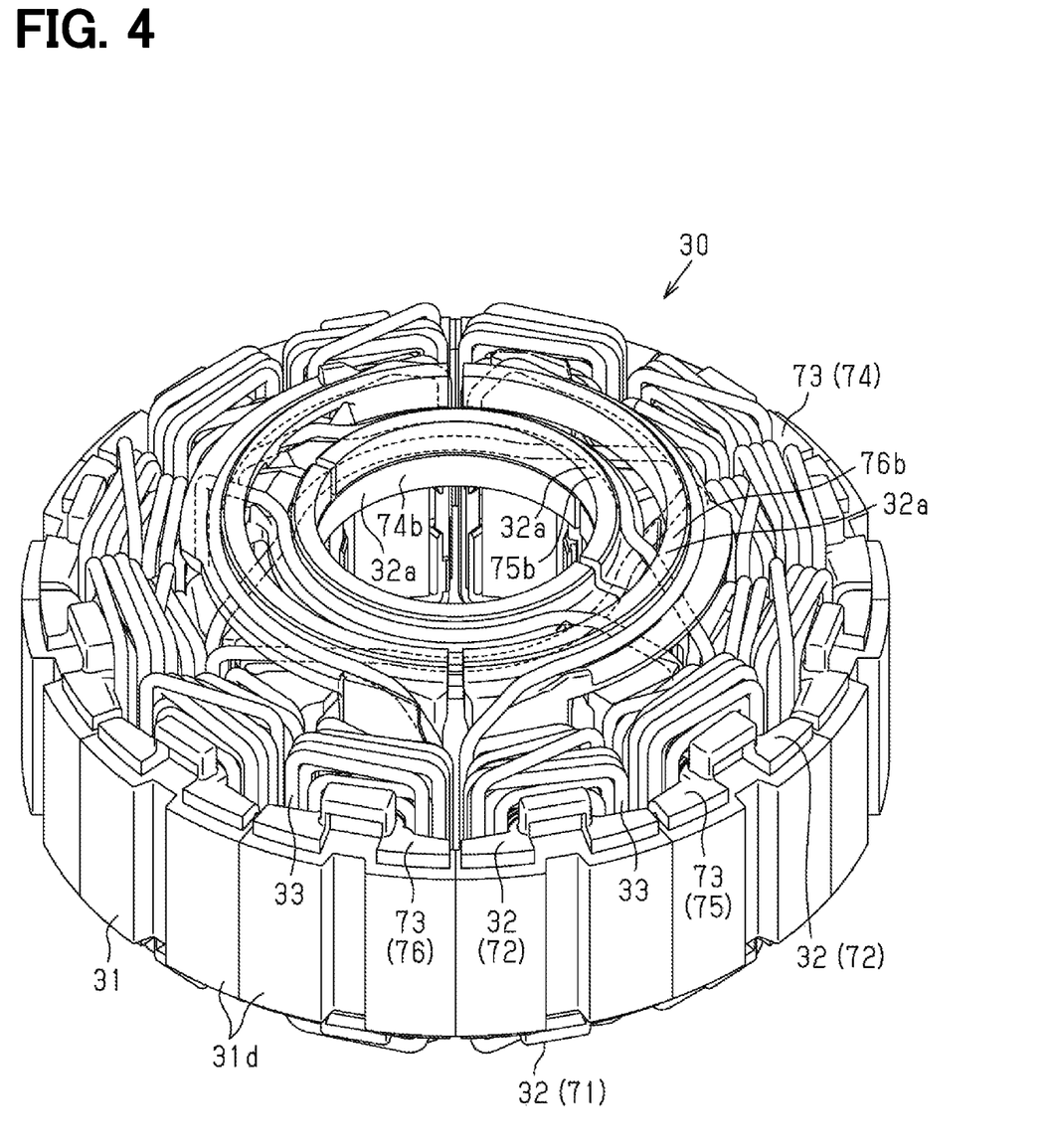
FIG. 4 is a perspective view of the stator in the embodiment.
Figure 5:
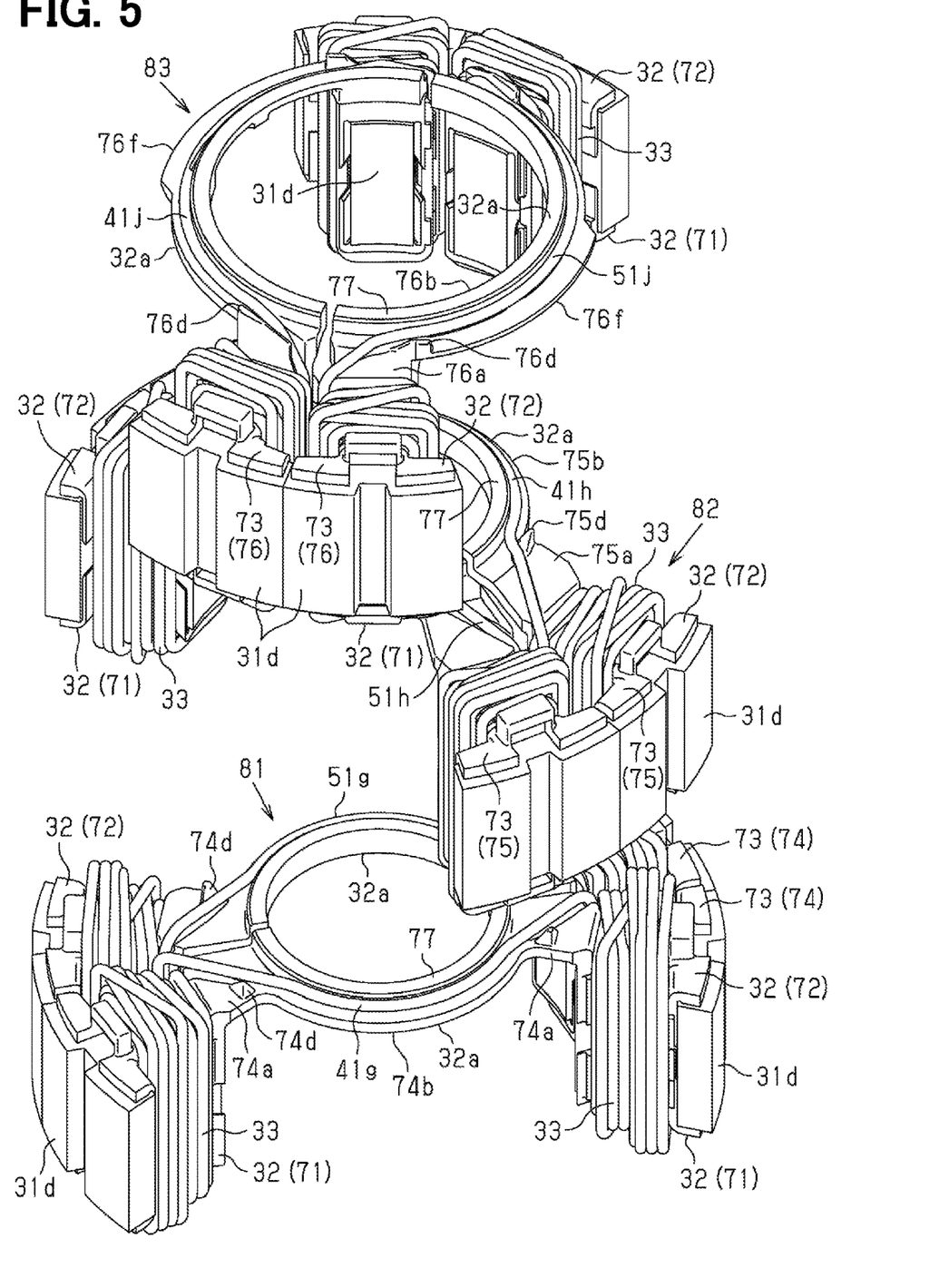
FIG. 5 is a partially exploded perspective view of a stator in the embodiment.
Figure 6:
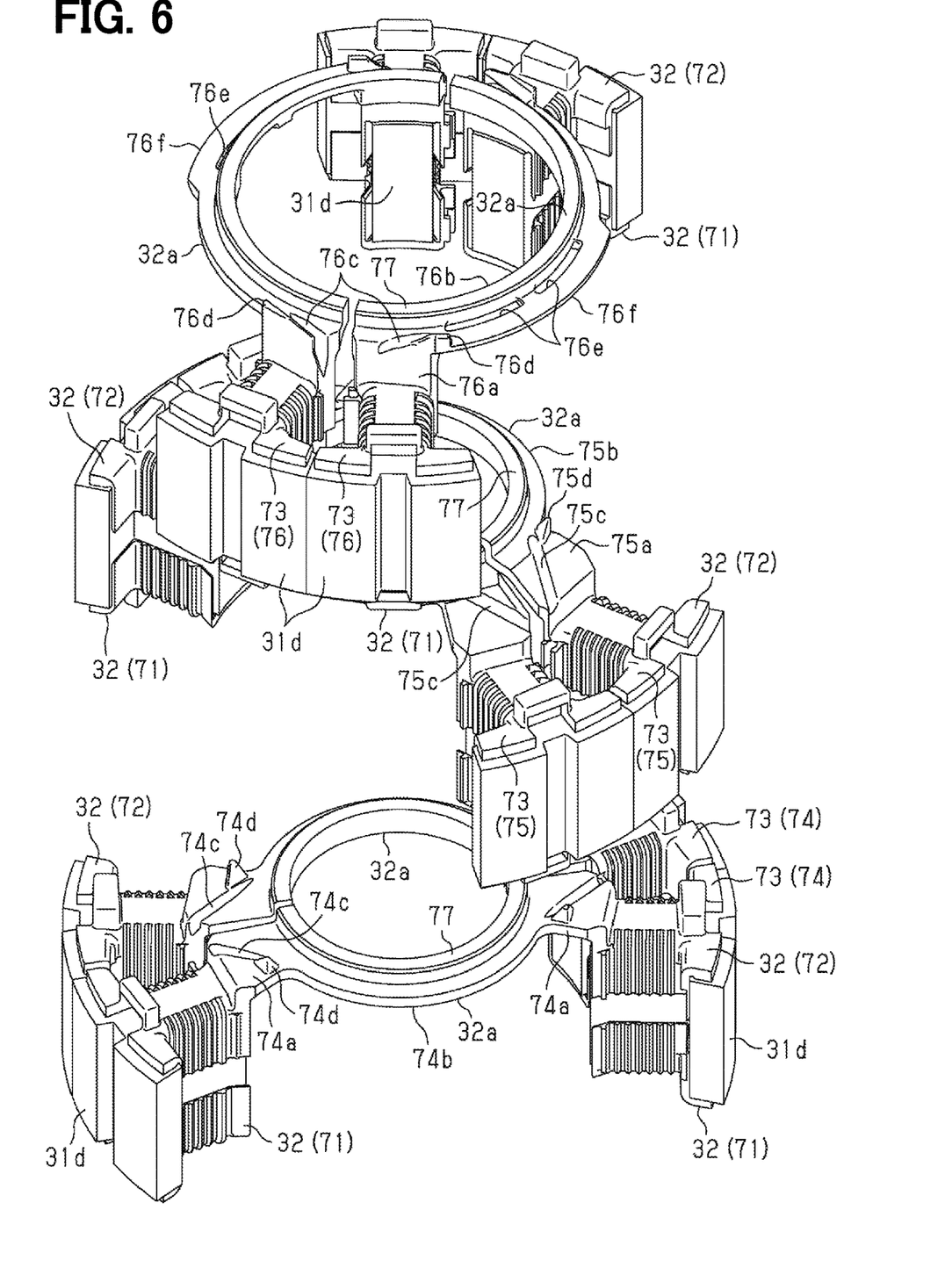
FIG. 6 is a partially exploded perspective view of a stator in the embodiment.

As shown in FIGS. 3 to 6, the insulator 32 of the present embodiment includes a first insulator 71 which is assembled from one axial side of the core constituent member 31d (the upper side in FIG. 3 and the lower side in FIGS. 4 to 6), and a second insulator 72 which is assembled from the other axial side of the core constituent member 31d (the lower side in FIG. 3 and the upper side in FIGS. 4 to 6). The two second insulators 72 are connected by the above-described guide portion 32a, and the second insulators 72 and the guide portion 32a constitute a connecting insulator member 73. The guide portion 32a connects the second insulators 72 separated by 150 degrees in the circumferential direction.

As shown in FIGS. 5 and 6, the connecting insulator member 73 includes a lower layer insulator member 74, an intermediate layer insulator member 75, and an upper layer insulator member 76 that are assembled in the axial direction. That is, in a state where the insulator 32 is assembled to the core constituent member 31d and the coil 33 is wound, the lower layer insulator member 74, the intermediate layer insulator member 75, and the upper layer insulator member 76 are sequentially assembled from the upper side in the order of the lower layer insulator member 74, the intermediate layer insulator member 75, and the upper layer insulator member 76 with the side where the guide portions 32a are provided facing upward. Also, a pair of lower layer insulator member 74, intermediate layer insulator member 75, and upper layer insulator member 76 are provided, and assembled in the axial direction in a paired state.

The guide portion 32a of the lower layer insulator member 74 includes lower layer extending parts 74a extending from a radially inner side of the insulator 32 to an inner side in the radial direction, and a lower layer arc connecting part 74b connecting the lower layer extending parts 74a. The lower layer arc connecting parts 74b are formed in an arc shape when viewed from the axial direction, and are approximately circular in a state where two lower layer insulator members 74 are arranged so as to form a pair.

The guide portion 32a of the intermediate layer insulator member 75 includes intermediate layer extending parts 75a extending from a radially inner side of the insulator 32 to an inner side in the radial direction, and an intermediate layer arc connecting part 75b connecting the intermediate layer extending parts 75a. The intermediate layer arc connecting parts 75b are formed in an arc shape when viewed from the axial direction, and are approximately circular in a state where two intermediate layer insulator members 75 are arranged so as to form a pair.

The guide portion 32a of the upper layer insulator member 76 includes upper layer extending parts 76a extending from a radially inner side of the insulator 32 to an inner side in the radial direction, and a upper layer arc connecting part 76b connecting the upper layer extending parts 76a. The upper layer arc connecting parts 76b are formed in an arc shape when viewed from the axial direction, and are approximately circular in a state where two upper layer insulator members 76 are arranged so as to form a pair.

An arc wall portion 77 protruding in the axial direction is formed on the radially inner side of the lower layer arc connecting part 74b, the intermediate layer arc connecting part 75b, and the upper layer arc connecting part 76b. The jumper wires 41g, 41h, 41j, 51g, 51h, 51j are guided along an outer surface in the radial direction of the arc wall portion 77.

Further, as shown in FIG. 6, guide recesses 74c, 75c, 76c for guiding the jumper wires 41g, 41h, 41j, 51g, 51h, 51j in the radial direction are formed on the lower layer extending parts 74a, the intermediate layer extending parts 75a, and the upper layer extending parts 76a respectively. The guide recesses 74c, 75c, and 76c of this embodiment are inclined toward the inner side in the radial direction and in the circumferential direction on the side where the lower layer arc connecting part 74b, the intermediate layer arc connecting part 75b, and the upper layer arc connecting part 76b. Further, protrusions 74d, 75d, 76d are respectively provided on the lower layer extending parts 74a, the intermediate layer extending parts 75a, and the upper layer extending parts 76a so as to be prevented from deviating from the guide recesses 74c, 75c, and 76c of the jumper wires 41g, 41h, 41j, 51g, 51h, and 51j.

Figure 7:
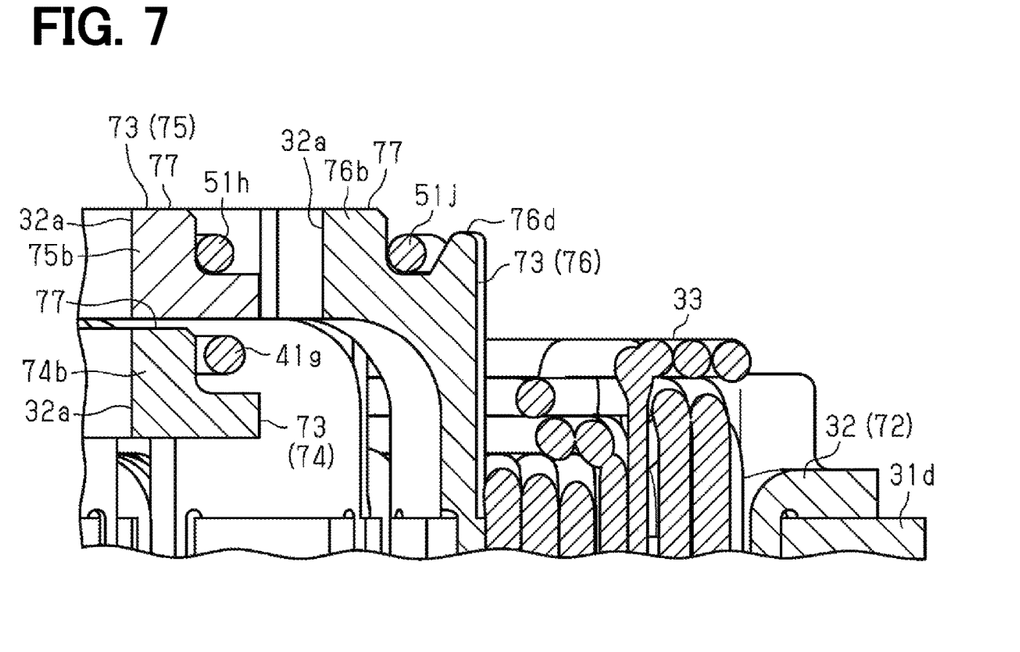
FIG. 7 is a cross-sectional view showing a part of the stator in the embodiment.

As shown in FIG. 7, the intermediate layer arc connecting part 75b is arranged above in the axial direction with respect to the lower layer arc connecting part 74b, and the upper layer arc connecting part 76b is arranged outside in the radial direction with respect to the intermediate layer arc connecting part 75b.

Figure 8:
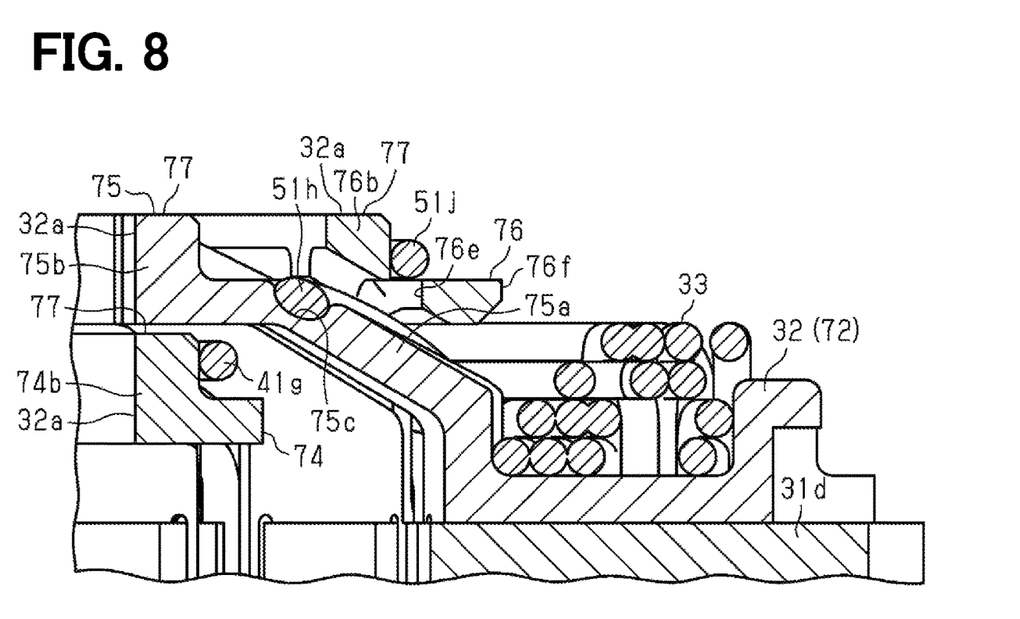
FIG. 8 is a cross-sectional view showing a part of the stator in the embodiment.

As shown in FIGS. 6 and 8, the upper layer arc connecting part 76b has a plurality of through holes 76e at the circumferential position facing the intermediate layer extending portion 75a. With this configuration, the space above the intermediate layer extending part 75a is increased, and the through holes 76e serve as a thinned portion. The through hole 76e penetrates in the axial direction.

As shown in FIG. 6, the upper layer arc connecting part 76b has a protruding part 76f protruding outward in the radial direction at a circumferential position corresponding to the through hole 76e.

Next, a method for manufacturing the stator 30 formed as mentioned above and its function will be described.

First, the insulator 32, specifically, the connecting insulator member 73 including the first insulator 71 and the second insulator 72 is assembled to the core constituent member 31d. Thereafter, the coil 33 is wound around the tooth 31b via the insulator 32. Then, the jumper wires 41g, 41h, 41j, 51g, 51h, 51j, which are the end of winding of the coil 33, are arranged along the guide portion 32a, and the coils 33 are wound another tooth 31b which is connected by the guide portion 32a via the insulator 32.

As shown in FIG. 5, the lower layer core unit 81 which has a pair of lower layer insulator members 74, the intermediate layer core unit 82 which has a pair of intermediate layer insulator members 75, and the upper layer core unit 83 which has a pair of upper layer insulator members 76 are manufactured, and the core unit 81, 82, and 83 are assembled in the axial direction. At this time, as shown in FIG. 7, the intermediate layer arc connecting part 75b is arranged in parallel in the axial direction at the same radial position of the lower layer arc connecting part 74b, and the upper layer arc connecting part 76b is arranged on the outer side in the radial direction at the same position in the axial direction of the intermediate layer arc connecting part 75b. And the stator core 31 is manufactured by welding the core extension portions 31c adjacent in the circumferential direction.

Then, as shown in FIG. 3, the guide body 61 of the guide member 60 is assembled on one side in the axial direction of the stator core 31, and the terminal lines 33a of the coils 33 are led out from the notches 63 to one side in the axial direction. Further, the terminal lines 33a of the coil 33 are bent in the circumferential direction, and are led out from a part of the circumferential direction to the one side in the axial direction of the pullout guide 62 through the pullout guide 62, thereby completing the manufacture of the stator 30.

Next, the effects of the present embodiment are described below.

(1) The intermediate layer arc connecting part 75b is arranged in parallel above in the axial direction with respect to the lower layer arc connecting part 74b, and the upper layer arc connecting part 76b is arranged in parallel outside in the radial direction with respect to the intermediate layer arc connecting part 75b. Therefore, an increase in the radial direction and in the axial direction of the guide portion 32a can be suppressed, and the guide portions 32a can be easily realized so that the guide portions 32a do not interfere with each other. In other words, in an arrangement other than the present embodiment, it is difficult to realize guide portions that do not interfere with each other, because of a complicated shape of the guide portions, and so on. However, in the present embodiment, it is possible to realize the guide portions 32a that do not interfere with each other due to a simple shape.

(2) The upper layer arc connecting part 76b has a plurality of through holes 76e at the circumferential position facing the intermediate layer extending portion 75a. With this configuration, the space above the intermediate layer extending part 75a is increased, and the through holes 76e serve as the thinned portion. Therefore, it is possible to avoid the interference between the jumper wires 41h and 51h arranged on the intermediate layer extending part 75a and the upper layer arc connecting part 76b while suppressing the increase in the overall axial size.

(3) The upper layer arc connecting part 76b has a protruding part 76f protruding outward in the radial direction at a circumferential position corresponding to the through hole 76e. Therefore, the rigidity of the upper layer arc connecting part 76b can be secured by compensating for lowering the rigidity of the upper layer arc connecting part 76b due to the provision of the through hole 76e.

(4) The guide recess 75c for guiding the jumper wires 41h, 51h inward in the radial direction is formed on the intermediate layer extending part 75a. Therefore, the positioning of the jumper wires 41h, 51h is facilitated, and interference between the jumper wires 41h, 51h and the upper layer arc connecting part 76b can be avoided while suppressing the increase in the overall axial size.

The above described embodiments may be modified as follows. The above described embodiments and the following modifications can be implemented in combination with one another as long as there is no technical contradiction.

In the above described embodiment, a restriction protrusion may be formed at the tip of at least one arc wall portion 77 of the intermediate layer arc connecting part 75b and the upper layer arc connecting part 76b, and protrudes outward in the radial direction so as to restrict the movement in the axial direction of the jumper wires 41h, 51h, 41j, 51j.

Figure 9:
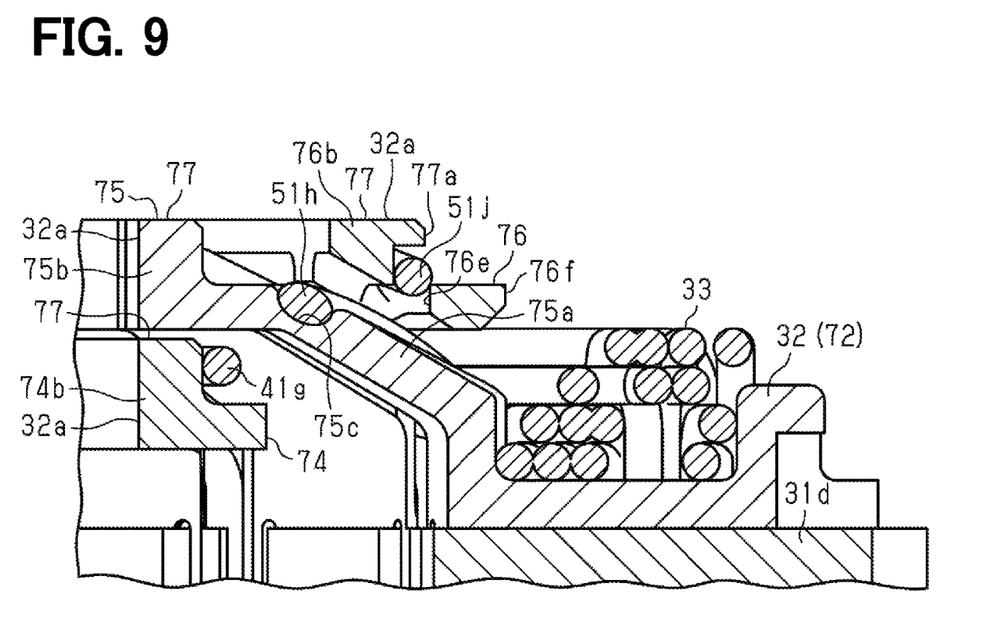
FIG. 9 is a cross-sectional view showing a part of the stator in another embodiment.
Figure 10:
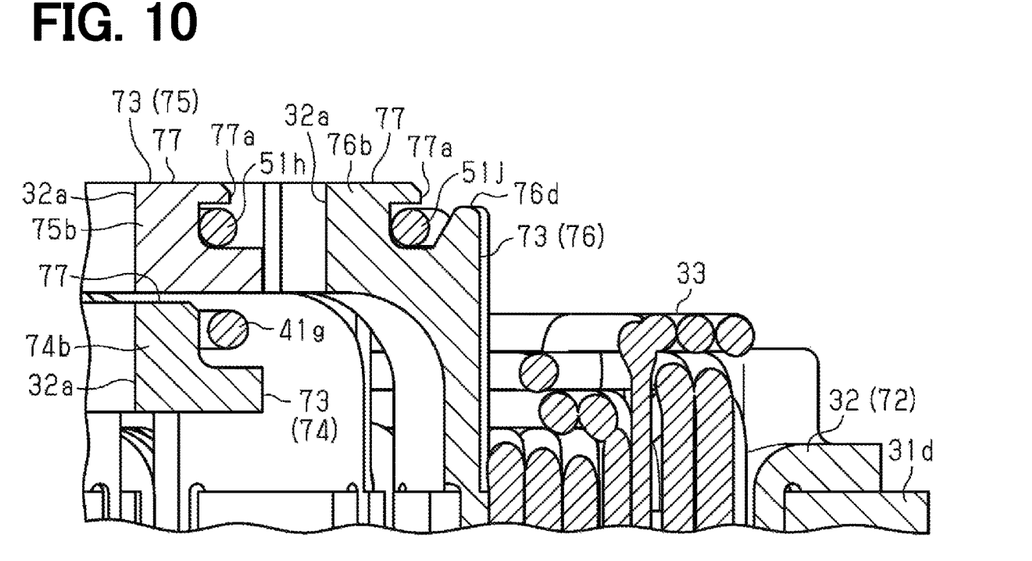
FIG. 10 is a cross-sectional view showing a part of the stator in another embodiment.

Specifically, for example, as shown in FIGS. 9 and 10, a restriction protrusion 77a that protrudes radially outward may be formed at the tip of the arc wall portion 77 of the intermediate layer arc connecting part 75b and the upper layer arc connecting part 76b. In the above described embodiment, it will be prevented that the jumper wires 41h, 51h, 41j, 51j jump out in the axial direction. In addition, since the intermediate layer arc connecting part 75b and the upper layer arc connecting part 76b are positioned above the lower layer arc connecting part 74b, the movement of an axial direction of the jumper wires is restricted even if the restriction protrusion is not provided. In the example shown in FIG. 9, a part of the jumper wire 51j guided on the upper layer arc connecting part 76b enters the inside of the through hole 76e. It is possible to suppress the increase in size in the axial direction while providing the restriction protrusion 77a.

In the above embodiment, the upper layer arc connecting part 76b has the through hole 76e as the thinned portion. However, the thinned portion may be provided on a position in the circumferential direction facing the intermediate layer extending part 75a so as to enlarge the space above the intermediate layer extending part 75a. For example, a thickness reduction part thinner than other part without penetrating may be adopted as the thinned portion. Moreover, the upper layer arc connecting part 76b which does not have the thinned portion may be adopted.

In the above embodiment, the upper layer arc connecting part 76b has the protruding part 76f protruding outward in the radial direction at the circumferential position corresponding to the through hole 76e. However, the configuration without the protruding part 76f may be adopted.

In the above embodiment, guide recesses 74c, 75c, 76c for guiding the jumper wires 41g, 41h, 41j, 51g, 51h, 51j in the radial direction are formed on the lower layer extending parts 74a, the intermediate layer extending parts 75a, and the upper layer extending parts 76a respectively. However, the guide recesses 74c, 75c, and 76c may be omitted.

In above mentioned embodiment, although the stator 30 which has twelve teeth 31b is disclosed, the stators having other than the number of the teeth 31b may be employed.

In the above described embodiment, the stator 30 is embodied as an armature in the inner rotor type brushless motor, but may be embodied in other armatures. For example, the present disclosure may be embodied in a stator as an armature in an outer rotor type brushless motor or a rotor as an armature in a brushed motor.

In an assumable stator that is an armature of a motor, a plurality of core constituent members having teeth extending inward in a radial direction are arranged in a circumferential direction, and coils are wound around the teeth via an insulator. The stator includes a connecting insulator member having two insulators spaced apart in the circumferential direction and a guide portion that connects them, and a jumper wire connecting the two coils is guided by the guide portion. Moreover, the connecting insulator member includes a lower layer insulator member, an intermediate layer insulator member, and an upper layer insulator member that are assembled in the axial direction. The guide portion of each of the insulator members includes a lower layer arc connecting part, an intermediate layer arc connecting part, and an upper layer arc connecting part that have respectively an arc shape when viewed from the axial direction. The intermediate layer arc connecting part is arranged in parallel with the lower layer arc connecting part in the radial direction, and the upper layer arc connecting part is arranged in the axial direction above the intermediate layer arc connecting part. Therefore, the enlargement in the axial direction is suppressed while suppressing the enlargement in the radial direction of the guide portion.

However, in the above-described stator, for example, the intermediate layer arc connecting part is arranged in parallel to the inner side in the radial direction of the lower layer arc connecting part. Therefore, it is difficult to form the intermediate layer inwardly extending part that extends inward in the radial direction from the insulator and connects to the intermediate layer arc connecting part so as not to interfere with the lower layer arc connecting part and the lower arc connecting part. Therefore, it has been difficult to realize the guide portion in which the guide portions do not interfere with each other.

The present disclosure has been made to solve the above-described problems, and an object of the present disclosure is to provide an armature that can easily realize the guide portion in which guide portions do not interfere with each other.

The armature includes a plurality of core constituent members (31d) that have teeth (31b) extending in a radial direction and are arranged side by side in a circumferential direction, a connecting insulator member (73) having an insulator (32) covering the teeth and a guide portion (32a) configured to connect two insulators spaced apart in the circumferential direction, coils (33) that is wound around the teeth via the insulator, and a jumper wire (41g, 41h, 41j, 51g, 51h, 51j) that is guided by the guide portion so as to connect two coils. The connecting insulator member includes a lower layer insulator member (74), an intermediate layer insulator member (75), and an upper layer insulator member (76) that are assembled in the axial direction. The guide portion of the lower layer insulator member includes a lower layer arc connecting part (74b) having an arc shape when viewed from the axial direction, the guide portion of the intermediate layer insulator member includes an intermediate layer arc connecting part (75b) having an arc shape when viewed from the axial direction, and the guide portion of the upper layer insulator member includes an upper layer arc connecting part (76b) having an arc shape when viewed from the axial direction. The intermediate layer arc connecting part is arranged above in the axial direction with respect to the lower layer arc connecting part, and the upper layer arc connecting part is arranged outside in the radial direction with respect to the intermediate layer arc connecting part.

According to the above configuration, the intermediate layer arc connecting part is arranged in parallel above in the axial direction with respect to the lower layer arc connecting part, and the upper layer arc connecting part is arranged in parallel outside in the radial direction with respect to the intermediate layer arc connecting part. Therefore, the guide portions can be easily realized so that the guide portions do not interfere with each other.

The invention claimed is:

1. An armature, comprising:
    a plurality of core constituent members that have teeth extending in a radial direction and are arranged side by side in a circumferential direction;
    a connecting insulator member having an insulator covering the teeth and a guide portion configured to connect two insulators spaced apart in the circumferential direction;
    coils that are wound around the teeth via the insulator; and
    a jumper wire that is guided by the guide portion so as to connect two coils, wherein
    the connecting insulator member includes a lower layer insulator member, an intermediate layer insulator member, and an upper layer insulator member that are assembled in the axial direction,
    the guide portion of the lower layer insulator member includes a lower layer arc connecting part having an arc shape when viewed from the axial direction, the guide portion of the intermediate layer insulator member includes an intermediate layer arc connecting part having an arc shape when viewed from the axial direction, and the guide portion of the upper layer insulator member includes an upper layer arc connecting part having an arc shape when viewed from the axial direction, and
    the intermediate layer arc connecting part is arranged above in the axial direction with respect to the lower layer arc connecting part, and the upper layer arc connecting part is arranged outside in the radial direction with respect to the intermediate layer arc connecting part.

2. The armature according to claim 1, wherein
the guide portion of the intermediate layer insulator member includes an intermediate layer extending part that extends from a radially inner side of the insulator to an inner side in the radial direction, and connects the intermediate layer arc connecting part, and
the upper arc connecting part includes a thinned portion so as to increase a space on the intermediate layer extending part at a circumferential position facing the intermediate layer extending part.

3. The armature according to claim 2, wherein
the thinned portion is a through hole penetrating in the axial direction.

4. The armature according to claim 2, wherein
the upper layer arc connecting part includes a protruding part protruding outward in the radial direction at a circumferential position corresponding to the thinned portion.

5. The armature according to claim 1, wherein
the guide portion of the intermediate layer insulator member has an intermediate layer extending part extending radially inward from the insulator and connected to the intermediate layer arc connecting part, and
a guide recess that guides the jumper wire in a radial direction is formed on the intermediate layer extending part.

6. The armature according to claim 1, wherein
an arc wall portion protruding in the axial direction is formed on a radially inner side of at least one of the intermediate layer arc connecting part and the upper layer arc connecting part so as to guide the jumper wire along an outer surface in the radial direction of the arc wall portion, and a restriction protrusion that is formed and protrudes outward in the radial direction so as to restrict the movement in the axial direction of the jumper wires.

7. The armature according to claim 1, wherein
the armature is a stator provided with a rotor on a radially inner side of the stator.

* * * * *